United States Patent [19]
Gustafsson et al.

[11] Patent Number: 6,067,413
[45] Date of Patent: May 23, 2000

[54] DATA REPRESENTATION FOR MIXED-LANGUAGE PROGRAM DEVELOPMENT

[75] Inventors: Niklas Gustafsson, Bellevue; John Hamby, Issaquah, both of Wash.

[73] Assignee: Instantations, Inc., Tualatin, Oreg.

[21] Appl. No.: 08/662,648

[22] Filed: Jun. 13, 1996

[51] Int. Cl.⁷ ...................................................... G06F 9/45
[52] U.S. Cl. .......................................... 395/701; 709/102
[58] Field of Search .................................. 709/106, 102; 395/705, 701, 702, 706

[56] References Cited

U.S. PATENT DOCUMENTS

| | | | |
|---|---|---|---|
| 4,802,165 | 1/1989 | Ream | 371/19 |
| 4,809,170 | 2/1989 | Leblang et al. | 364/200 |
| 4,953,084 | 8/1990 | Meloy et al. | 364/200 |
| 5,170,465 | 12/1992 | McKeeman et al. | 395/700 |
| 5,175,856 | 12/1992 | Van Dyke et al. | 395/700 |
| 5,182,806 | 1/1993 | McKeeman et al. | 395/700 |
| 5,193,191 | 3/1993 | McKeeman et al. | 395/700 |
| 5,201,050 | 4/1993 | McKeeman et al. | 395/700 |
| 5,204,960 | 4/1993 | Smith et al. | 395/700 |
| 5,265,254 | 11/1993 | Blasciak et al. | 395/700 |
| 5,291,583 | 3/1994 | Bapat et al. | 395/500 |
| 5,307,499 | 4/1994 | Yin et al. | 395/700 |
| 5,325,531 | 6/1994 | McKeeman et al. | 395/700 |
| 5,327,562 | 7/1994 | Adcock et al. | 395/700 |
| 5,339,431 | 8/1994 | Rupp et al. | 395/700 |
| 5,339,433 | 8/1994 | Frid-Nielsen | 395/700 |
| 5,355,494 | 10/1994 | Sistare et al. | 395/700 |
| 5,357,628 | 10/1994 | Yuen | 395/575 |
| 5,371,747 | 12/1994 | Brooks et al. | 371/19 |
| 5,375,239 | 12/1994 | Mortson | 395/700 |
| 5,426,648 | 6/1995 | Simamura | 371/19 |
| 5,432,795 | 7/1995 | Robinson | 371/19 |
| 5,459,868 | 10/1995 | Fong | 395/700 |

FOREIGN PATENT DOCUMENTS

| | | |
|---|---|---|
| 90307228 | 2/1990 | European Pat. Off. . |
| 91115971 | 9/1991 | European Pat. Off. . |
| 2701580 | 10/1993 | France . |
| H6-161726 | of 1994 | Japan . |
| H6-266563 | of 1994 | Japan . |
| H6-274349 | of 1994 | Japan . |
| H6-83597 | of 1994 | Japan . |
| PCT/US91/04064 | 6/1991 | WIPO . |
| PCT/US93/05368 | 6/1993 | WIPO . |
| PCT/US94/00041 | 6/1993 | WIPO . |
| PCT/US94/00342 | 6/1993 | WIPO . |

*Primary Examiner*—Majid A. Banankhah
*Attorney, Agent, or Firm*—LaRiviere, Grubman & Payne, LLP

[57] ABSTRACT

Method for enabling the simultaneous use of a first and a second programming language within a computer program, and apparatus to practice the method. To enable this sharing of languages, the present invention first provides for a common runtime representation of the data between the several languages in a program as a shared object model. The shared object model includes the layout of complex data structures (e.g., classes), the creation of data, the calling conventions, the destruction of data, the runtime representation of type information, dynamic function call dispatch, and dynamic type conversions. The use of a shared object model enables the sharing of the several compilers' internal representation of data between the different languages as a persistent shared symbol table. This shared internal data representation enables the several compilers to define their respective internal data representations in terms common to each of the compilers.

10 Claims, 3 Drawing Sheets

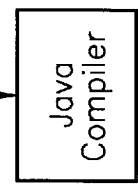
FIG. 2A
Class C:B{
  int x;
};
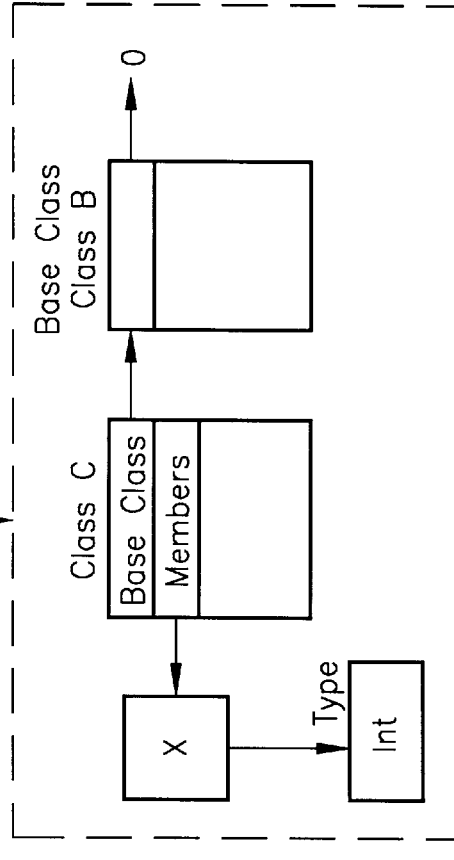
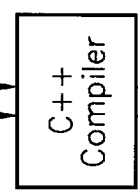
FIG. 2B
Class C extends B{
  int x;
};
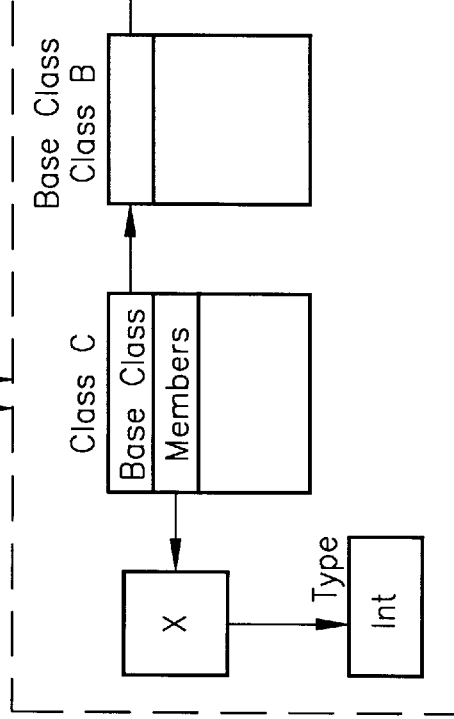

DATA REPRESENTATION FOR MIXED-LANGUAGE PROGRAM DEVELOPMENT

COPYRIGHT NOTIFICATION

Portions of this patent application contain materials that are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present invention relates to object-oriented language implementation, in particular the implementation of several different programming languages which can interoperate in a single given software program.

BACKGROUND ART

One software development problem relates to the use of two or more programming languages to implement a software project under development. By way of example, but not limitation, there is currently significant interest in the use of both the Java and C++ programming languages in developing a given software application. In other words, recent advantages in computational languages, particularly object-oriented programming languages, have given rise to the situation where a given software product may, for any of a number of business or computational reasons, require implementation in more than one programming language.

It will be appreciated that the largest problem to be dealt with when mixing languages in a given program is that the several languages are usually very different. If this were not the case, there would be little reason for using more than one language to write the program. Certain combinations of languages have so little in common, that the sharing of data between the languages is nearly impossible, except through file transfer or some other means of external streaming of the data. This gives rise to the problem that the program units written in the several languages require the conversion of the data therebetween in order to communicate it to other units of a different language. Sometimes, it is not known which language another program unit is written in and it therefore becomes necessary to convert the data before passing it to a program unit written in the same language.

The solution to this problem has heretofore been to choose the several programming languages very carefully. It is often the case that a developer will use a special purpose language, such as Java, and a very general-purpose language, like C, and tries to express the former in terms of the latter. While this is occasionally possible, it is extremely difficult to implement, because the general-purpose language expression of the special-purpose language is usually very involved. Accordingly, the cost of programming in this manner is substantially increased.

This problem occurs since programming languages are generally developed without any intent of mixing them with any given single application. Accordingly, the compilers for the several languages are not coordinated with one another. This shifts the problem of presenting a unified representation of the data, best taken care of by the compiler to the programmer. As previously discussed, the cost of programming in an environment where data must be converted to a third representation, e.g. so-called transfer files, or where a developer must use a language which is too general in purpose, is high. This, of course, adversely effects programmer productivity and the attendant production costs of the software program.

Having reference to FIG. 1, and further to the discussion of the C++ and Java programming languages, it should be noted that the concepts capable of facile implementation in Java are generally implementable in C++, although the converse is not necessarily the case. The congruency between the more generalized language, C++ and the more specialized language, Java is shown in the Venn diagram of the figure. This congruence, along with certain marked similarities in the syntax of the two languages, gives rise to the possibility that a methodology might be found which will enable a software developer to mix languages in a program under development. If this language mixing could be effected by sharing data therebetween with minimal developer input and without computational performance penalties, significant advantages in computational efficiency and programmer productivity would accrue.

DISCLOSURE OF INVENTION

To enable a software developer to mix languages in a program under development by sharing date therebetween, the present invention teaches two processes in operative combination.

First, the present invention provides for a common runtime representation of the data between the several languages in a program. This includes the layout of complex data structures (e.g., classes), the creation of data, the calling conventions, as well as the destruction of data. Further, the runtime representation of type information, dynamic function call dispatch, and dynamic type conversions are also shared. These elements, excluding the common calling conventions, are often referred to as a languages object model. By making this runtime representation common throughout the several languages in a given software application, the present invention teaches a shared object model which makes the interfaces between the languages trivial.

The use of a shared object model enables the second process, that of sharing the several compilers' internal representation of data between the different languages. This internal representation, in general usage in compiled languages, is the compiler symbol table. The present invention teaches a persistent shared symbol table which enables the several compilers to define their respective internal data representations in terms common to all. The use of a shared symbol table realizes several benefits. First, each compiler understands how the other compilers represent data internally, so data generated by one compiler is usable by the other compilers. Data objects defined by one compiler, and persistently stored in the symbol table which is unequivocally usable by all other compilers. Secondly, this advantage is accomplished with little or no developer input required, thereby relieving the developer of the burden of providing the interfaces between the languages.

Other features of the present invention are disclosed or apparent in the section entitled "BEST MODE OF CARRYING OUT THE INVENTION".

BRIEF DESCRIPTION OF THE DRAWINGS

For fuller understanding of the present invention, reference is made to the accompanying drawing taken in conjunction with the following detailed description of the Best Mode of Carrying Out the Invention. In the drawing:

FIGS. 2A and 2B represent the results of the use of C++ and Java compilers modified to implement the shared symbol table of the present invention.

Figure 1:
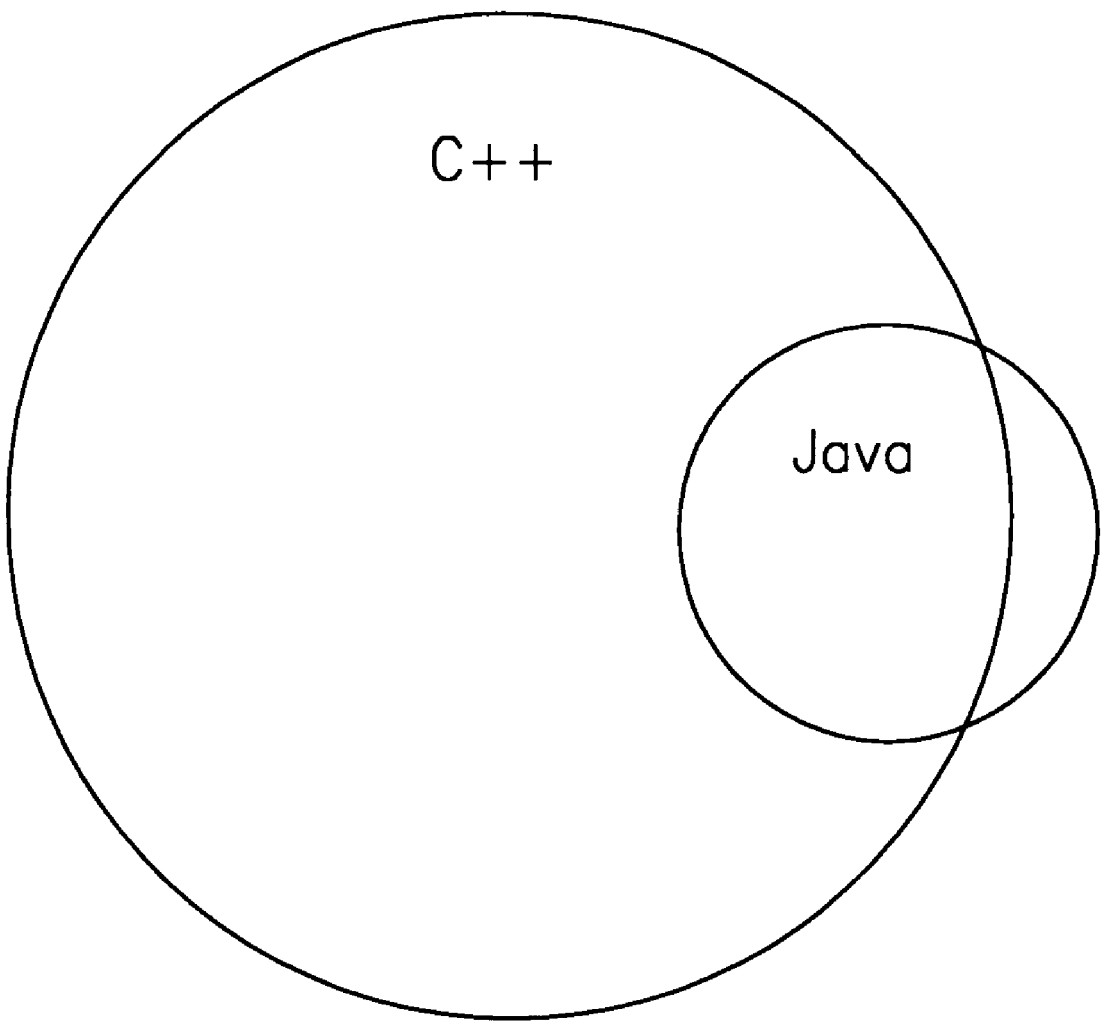
FIG. 1 is a Venn diagram illustrating the relationship between the functionalities of the C++ and Java programming languages.

Reference numbers refer to the same or equivalent parts of the invention throughout the several figures of the drawing.

BEST MODE OF CARRYING OUT THE INVENTION

The present invention teaches a method to enable the simultaneous utilization of two or more computational languages within a given software program, and apparatus to effect the method. The method is implementable on a computing device, for example a general purpose programmable digital computer including CPU, bus, memory device, input/output device(s).

To effect the shared object model, the layout of complex data structures (e.g., classes), the creation of data, the calling conventions, the destruction of data, the runtime representation of type information, dynamic function call dispatch, and dynamic type conversions are shared between the several programming languages being utilized.

The shared object model enables the sharing the several compilers' internal representation of data between the different languages by means of a shared symbol table, which enables the several compilers to define their respective internal data representations in terms common to all. Thus, the use of a shared symbol table realizes two benefits. First, each compiler understands how the others represent data internally, so data generated by one compiler is usable by the others. Secondly, this advantage is accomplished with little or no developer input required and with substantially no penalty in computational performance.

To effect the shared object model, it is generally necessary to modify at least one of the compilers to ensure that its symbol table definition is brought into conformance with the others. In one preferred embodiment of the present invention implementing the mixing of the C++ and Java programming languages, the Java compiler is designed so that it utilizes an internal data representation which conforms to that of the C++ compiler. An example of this is shown in FIGS. 2A and 2B. The statements input in each case are functional equivalents in C++ and Java, respectively. At FIG. 2A, the internal representation of the statement is placed into the shared symbol table. At FIG. 2B the Java compiler, as designed in conformance with the principles of the present invention, renders the statement's internal representation in a format compatible with C++, and it is so stored in the shared symbol table. It should be noted that the double lines in the drawing refer to data flow, the single lines to pointers, and the items circumscribed by broken lines those data objects stored in the persisted shared symbol table.

Figure 3:
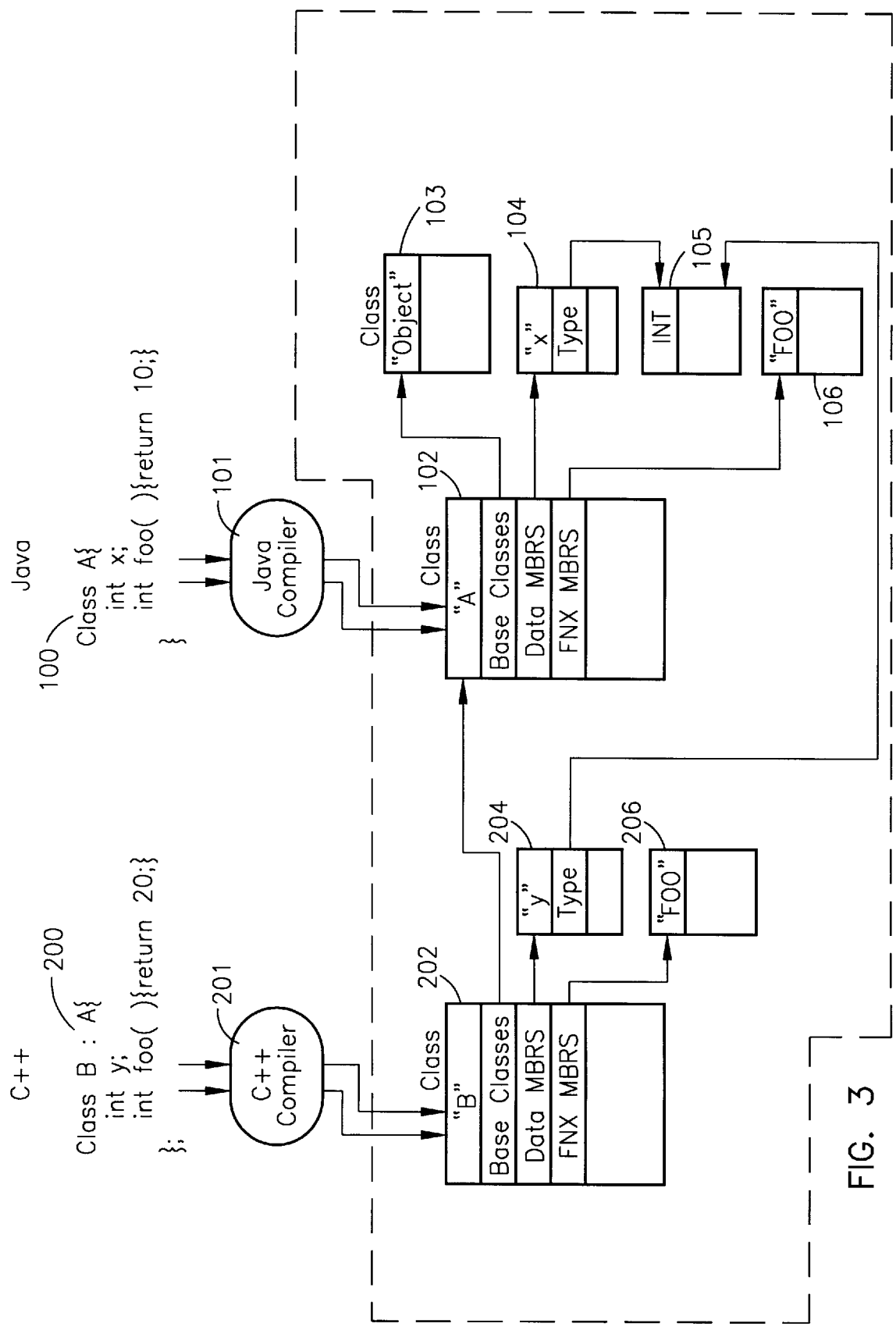
FIG. 3 is a representation of the persistent storage and sharing of internal data representations effected by the principles of the present invention.

As previously discussed, the symbol table is persistent, and the data objects stored therein are the internal representations of data structures which are declared by any one of the compilers, but which are usable and accessible by all the compilers implementing the software program. These features are shown at FIG. 3. Having reference to that figure, a first class, A, is declared from the Java programming language at 100. It should be noted here that in Java there exists a class called "Object", and if a class is not derived from another class, it is derived from the class "Object". After the class is declared by the developer at 100, it is compiled by the previously defined Java compiler 101 implementing the principles of the present invention. As a result of compilation, the resultant internal data structures are stored the persistent symbol table. The compiled representation of the class contains the class definition "A" 102, and pointers to the base class (in this case the class "Object" 103); the data members ("x", 104, which contains a further pointer to the type "int", 105); and the functional members, "foo", 106.

A second class, B is declared by developer using the C++ programming language at 200. As shown therein, class "B" is derived from class "A". After the class is declared it is compiled by the previously defined C++ compiler 201 implementing the principles of the present invention. As a result of compilation, the resultant internal data structures are stored in the same persistent symbol table used by Java compiler 101. The compiled representation of class "B" contains the class definition "B" 202, and pointers to the base class (in this case the class "A" previously declared at 102); the data members ("y", 204, which contains a further pointer to the type "int", previously declared at 105); and the functional members, "foo" 206.

This example illustrates both persistence and the sharing by a second compiler of the internal data representation declared by a first compiler. In this example, the second class, B, declared by the developer using the C++ compiler is derived from a first class "A', previously declared using the Java compiler. In similar fashion, the type "int" declared by data member "x" of the class defined by Java is later utilized in declaring the data member "y" declared by the C ++ compiler. This simple case, where a class declared in one language is derived from another class declared in another language, is made by way of illustration. It is contemplated that in any given substantial programming effort which implements the principles of the present invention, any of the data objects declared therein may derive from or refer to other data objects declared in any of the languages utilized in the application.

It should be noted that in this example, one specific compiler (the more specialized Java compiler) was designed to bring its internal representation of data into conformance with the other (more generalized, C++) compiler. It may be necessary in some implementations however to re-design either or all of the affected compilers. The principles of the present invention specifically contemplate such implementations.

The specifics of compiler re-design required to utilize the persistent shared symbol table taught herein and to implement the other principles of the present invention for a given application are both highly specific to that implementation and well within the abilities of one having ordinary skill in the art of compiler design.

The present invention may be implemented on any data storage or transfer medium known to those of ordinary skill in the art. By way of illustration, but not limitation, such media include but are not necessarily limited to: magnetic media including magnetic disks, tapes, hard drives and the like; electronic memory devices including RAM, flash memory and the like; mechanical data storage materials including punch tape and Hollerith cards; and optical media including CD-ROM, "floptical" drives and the like. Furthermore, the principles of the present invention specifically contemplate the transfer thereof over any media including telephone lines or other electronic networks to include local and wide area nets, including but not limited to the Internet. The principles of the present invention further specifically contemplate such implementation for the storage, use, transfer, sale, lease, rental or any and all other usages thereof.

The present invention has been particularly shown and described with respect to certain preferred embodiments of features thereof. However, it should be readily apparent to those of ordinary skill in the art that various changes and modifications in form and detail may be made without departing from the spirit and scope of the invention as set forth in the appended claims. In particular, it will be obvious to those of ordinary skill in the art that the implementation of either or both the shared object model and shared symbol may be used to good effect on other computational problems not discussed herein. The principles of the present invention specifically contemplate all such implementations and combinations. Finally, while the term "compiler" has been used throughout, it will be apparent to those of ordinary skill in the art that this usage is general, and contemplates the use of a wide variety of translators, interpreters and other compiler-like implementations. The invention disclosed herein may be practiced without any element which is not specifically disclosed herein.

What is claimed is:

1. A method for running a computer program with a first part in a first programming language with a first data structure and a second part in a second programming language with a second data structure, which is different than the first data structure, on a computing device with a CPU, bus means and memory means, comprising the steps of:

compiling the first part of the computer program into a compiled first part of the computer program with a compiled first data structure;

compiling the second part of the computer program, generating a second compiled part and transforming the second data structure of the second part of the computer program so that it is compatible with the compiled first data structure, so that the compiled second part of the computer program is able to read data formatted according to the compiled first data structure;

running the first compiled part;

running the second compiled part; and sharing data between the first compiled part and the second compiled part formatted according to the compiled first data structure.

2. The method, as recited in claim 1, further comprising the step of generating a persistent shared symbol table of internal data representations of the first programming language and the second programming language.

3. The method, as recited in claim 1, wherein the step of compiling the second part of the computer program, comprises a step of using the persistent shared symbol table to transform the second data structure.

4. The method, as recited in claim 3, wherein the step of compiling the first part, uses the persistent shared symbol table to compile the first data structure to the compiled first data structure.

5. The method, as recited in claim 3, wherein the persistent shared symbol table contains information regarding creation of data, calling conventions, destruction of data, runtime representation of type information, dynamic function call dispatch, and dynamic type conversions.

6. The method, as recited in claim 1, wherein the step of running the second compiled part, runs the second compiled part simultaneously with the step of running the first compiled part.

7. An apparatus for running a computer program with a first part in a first programming language with a first data structure and a second part in a second programming language with a second data structure, which is different than the first data structure, comprising:

means for compiling the first part of the computer program into a compiled first part of the computer program with a compiled first data structure;

means for compiling the second part of the computer program, generating a second compiled part and transforming the second data structure of the second part of the computer program so that it is compatible with the compiled first data structure, so that the compiled second part of the computer program is able to read data in formatted according to the compiled first data structure;

means for running the first compiled part;

means for running the second compiled part; and means for sharing data between the first compiled part and the second compiled part formatted according to the compiled first data structure.

8. The apparatus, as recited in claim 7, further comprising means for generating a persistent shared symbol table of internal data representations of the first programming language and the second programming language.

9. The apparatus, as recited in claim 7, wherein the means for compiling the second part of the computer program, comprises a means for using the persistent shared symbol table to transform the second data structure.

10. The apparatus, as recited in claim 7, wherein the means for running the second compiled part, comprises means for running the second compiled part simultaneously to running the first compiled part.

* * * * *